US 12,446,970 B2

United States Patent
Islam et al.

(10) Patent No.: US 12,446,970 B2
(45) Date of Patent: Oct. 21, 2025

(54) FUNCTIONAL ULTRASOUND IMAGING FOR SPINAL CORD STIMULATION ELECTRODE GUIDANCE AND STIMULATION PARAMETER OPTIMIZATION

(71) Applicant: Mayo Foundation for Medical Education and Research, Rochester, MN (US)

(72) Inventors: Riazul Islam, Rochester, MN (US); Igor A. Lavrov, Rochester, MN (US); Shigao Chen, Rochester, MN (US); Pengfei Song, Champaign, IL (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 480 days.

(21) Appl. No.: 17/763,391

(22) PCT Filed: Sep. 28, 2020

(86) PCT No.: PCT/US2020/053140
§ 371 (c)(1),
(2) Date: Mar. 24, 2022

(87) PCT Pub. No.: WO2021/062396
PCT Pub. Date: Apr. 1, 2021

(65) Prior Publication Data
US 2022/0354589 A1  Nov. 10, 2022

Related U.S. Application Data

(60) Provisional application No. 62/906,336, filed on Sep. 26, 2019.

(51) Int. Cl.
*A61B 8/06* (2006.01)
*A61B 8/00* (2006.01)
(Continued)

(52) U.S. Cl.
CPC ............. *A61B 34/20* (2016.02); *A61B 8/06* (2013.01); *A61B 8/469* (2013.01); *A61B 8/488* (2013.01);
(Continued)

(58) Field of Classification Search
CPC ......... A61B 8/06; A61B 8/488; A61B 8/5207; A61B 8/5223; A61N 1/0551;
(Continued)

(56) References Cited

U.S. PATENT DOCUMENTS 6,001,063 A * 12/1999 Guracar .............. G01S 15/8979
600/453
2014/0058292 A1  2/2014 Alford et al.
(Continued)

FOREIGN PATENT DOCUMENTS

WO  2019110402 A1  6/2019
WO  2019147679 A1  8/2019
WO  2021062396 A1  4/2021

OTHER PUBLICATIONS

Song P, Cuellar CA, Tang S, Islam R, Wen H, Huang C, Manduca A, Trzasko JD, Knudsen BE, Lee KH, Chen S, Lavrov IA. Functional Ultrasound Imaging of Spinal Cord Hemodynamic Responses to Epidural Electrical Stimulation: A Feasibility Study. Front Neurol. Mar. 26, 2019;10:279. (Year: 2019).*
(Continued)

*Primary Examiner* — Amelie R Davis
(74) *Attorney, Agent, or Firm* — Quarles & Brady LLP

(57) ABSTRACT

Functional ultrasound imaging ("fUS") is used to facilitate the placement of electrodes for spinal cord stimulation and to optimize and update stimulation parameters for spinal cord stimulation devices.

8 Claims, 11 Drawing Sheets

(51) Int. Cl.
  *A61B 34/20* (2016.01)
  *A61N 1/05* (2006.01)
  *G01S 15/89* (2006.01)
  *G06T 5/70* (2024.01)
  *G06T 7/00* (2017.01)
  *G06T 7/20* (2017.01)

(52) U.S. Cl.
  CPC .......... *A61B 8/5207* (2013.01); *A61B 8/5223* (2013.01); *A61B 8/5276* (2013.01); *G01S 15/8915* (2013.01); *G06T 5/70* (2024.01); *G06T 7/0012* (2013.01); *G06T 7/20* (2013.01); A61B 2034/2063 (2016.02); A61N 1/0551 (2013.01); G06T 2207/10132 (2013.01)

(58) Field of Classification Search
  CPC ...... A61N 1/36062; G06T 2207/10132; G06T 5/70; G06T 7/0012; G06T 7/20
  See application file for complete search history.

(56) References Cited

U.S. PATENT DOCUMENTS

| | | | |
|---|---|---|---|
| 2015/0012068 A1* | 1/2015 | Bradley | A61N 1/36071 607/62 |
| 2018/0220997 A1 | 8/2018 | Song et al. | |
| 2019/0053780 A1 | 2/2019 | Song et al. | |
| 2019/0059832 A1 | 2/2019 | Von Novak, III et al. | |
| 2019/0347797 A1* | 11/2019 | Bagherinia | G06T 7/0012 |

OTHER PUBLICATIONS

International Search Report of related PCT/US2020/053140, mailed on Mar. 12, 2021, 5 pages.
Written Opinion of related PCT/US2020/053140, mailed on Mar. 12, 2021, 10 pages.

* cited by examiner

FUNCTIONAL ULTRASOUND IMAGING FOR SPINAL CORD STIMULATION ELECTRODE GUIDANCE AND STIMULATION PARAMETER OPTIMIZATION

CROSS-REFERENCE TO RELATED APPLICATIONS

This application represents the national stage entry of PCT/US2020/053140 filed on Sep. 28, 2020 and claims the benefit of U.S. Provisional Patent Application Ser. No. 62/906,336, filed on Sep. 26, 2019, and entitled "FUNCTIONAL ULTRASOUND IMAGING FOR SPINAL CORD STIMULATION ELECTRODE GUIDANCE AND STIMULATION PARAMETER OPTIMIZATION," the contents of which is herein incorporated by reference in its entirety.

BACKGROUND

Epidural electrical spinal cord stimulation ("SCS") has been successfully implemented to help patients with chronic intractable pain. Further, SCS has been reported as a promising alternative strategy to alleviate symptoms of motor impairments for multiple sclerosis and Parkinson's disease, and to improve motor and autonomic functions in patients with spinal cord injury. The therapeutic effects of SCS rely on the stimulation parameters used (e.g., intensity, frequency, pulse width, burst versus continuous stimulation, electrode configuration).

Electromyography ("EMG") is widely used as a diagnostic tool for neuromuscular disease and a research tool for disorders of motor control. However, the EMG signal is limited and can provide one-dimensional information concerning the activation of spinal cord neurons. In this context, a combination of emerging, innovative techniques providing high spatial and temporal resolution, and electrophysiology techniques could provide critical information on mechanisms of SCS and further facilitate optimizations of SCS protocols.

Spatial and/or temporal resolution of available functional imaging tools, such as PET and MEG, are far below what is required for evaluation of the spinal cord functional changes during SCS. Although the spatial resolution of functional magnetic resonance imaging ("fMRI") reaches submillimeter with ultra-high magnetic field, the size of the MRI scanner can be prohibitive for an intraoperative monitoring.

SUMMARY OF THE DISCLOSURE

The present disclosure addresses the aforementioned drawbacks by providing a method for guiding placement of an electrode on a spinal cord of a subject using an ultrasound system. The method includes accessing ultrasound data with a computer system, the ultrasound data having been acquired with an ultrasound system horn a region-of-interest containing a spinal cord of a subject. Hemodynamic response data are generated from the ultrasound data, wherein the hemodynamic response data are indicative of a hemodynamic response in the spinal cord of the subject. Surgical navigation data are generated using the hemodynamic response data. The surgical navigation data indicate one or more spatial locations for positioning an electrode for providing electrical stimulation to the spinal cord of the subject.

It is another aspect of the present disclosure to provide a method for updating electrical stimulation parameters based on data acquired with an ultrasound system. The method includes accessing ultrasound data with a computer system, wherein the ultrasound data have been acquired with an ultrasound system from a region-of-interest containing a spinal cord of a subject while electrical stimulation was applied to the spinal cord by an electrode. From the ultrasound data, hemodynamic response data indicative of a hemodynamic response in the spinal cord of the subject are generated. Updated stimulation parameters are then generated using the hemodynamic response data. The updated stimulation parameters indicate settings for a spinal cord stimulation system for delivering electrical stimulation to the spinal cord of the subject.

It is another aspect of the present disclosure to provide a spinal cord stimulation system. The spinal cord stimulation system includes an electrode, a pulse generator in communication with the electrode, a memory having stored thereon stimulation parameters, and a controller in communication with the pulse generator and the memory. The controller retrieves the stimulation parameters from the memory and applies them to the pulse generator, which in response generates a stimulation signal that is applied to the electrode in order to cause the electrode to generate an electrical stimulation. The controller is also programmed to receive hemodynamic response data, process the hemodynamic response data to update the stimulation parameters, and store the updated stimulation parameters in the memory.

The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention.

BRIEF DESCRIPTION OF THE DRAWINGS

FIG. 5A shows examples of spinal cord blood volume change ($\Delta$SCBV) data color coded on the Power Doppler ("PD") images at several point times. FIGS. 5B and 5C show $\Delta$SCBV curves and $\Delta$EMG signals, respectively, for an example case with sub-threshold EES and silent EMG. FIG. 5D shows a plot of $\Delta$SCBV peak response versus $\Delta$EMG for example cases with silent EMG signals.

DETAILED DESCRIPTION

Figure 1:
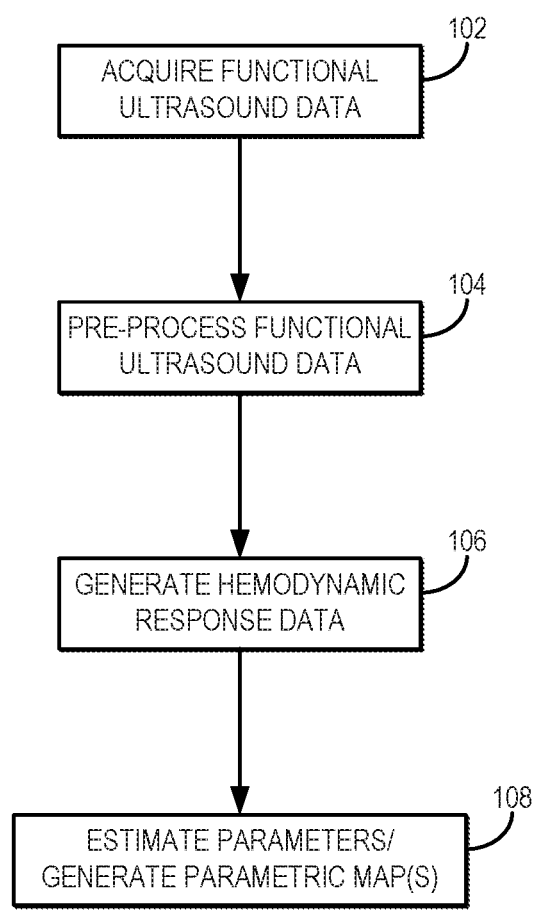
FIG. 1 is a flowchart setting forth the steps of an example method for using functional ultrasound imaging to generate hemodynamic response data, which may be used to guide placement of spinal cord stimulation electrodes and to update and optimize spinal cord stimulation parameters.

Described here are systems and methods for using functional ultrasound imaging ("fUS") to facilitate the placement of electrodes for spinal cord stimulation and to optimize and update stimulation parameters for spinal cord stimulation devices.

These fUS imaging techniques provide an emerging method that leverages ultrafast plane wave imaging (or other suitable imaging) techniques and the neurovascular coupling effect to monitor hemodynamic responses of tissue associated with neural activities. Ultrafast plane wave imaging allows acquisition and accumulation of ultrasound data at 10-20 kHz frame rate, significantly boosting the Doppler sensitivity to small vessels for fUS imaging. The rich spatiotemporal information of ultrafast plane wave data also allows implementation of more robust and intelligent tissue clutter filters based on singular value decomposition ("SVD"), further improving the sensitivity of monitoring small vessel hemodynamic responses for fUS.

In contrast to fMRI which responds to both hemodynamic and metabolic variations, fUS is only sensitive to hemodynamic effects. Therefore, interpretations of fUS results are not confounded by the complex interactions between the hemodynamic and metabolic effects. As compared to other imaging techniques, fUS has higher spatial and temporal resolutions and also potentially can be performed on freely moving subjects with miniaturized transducer size for long-term and real-time monitoring. This opens new directions for potential applications of fUS, since currently there is no available technique that could evaluate functional changes in spinal cord in real-time in vivo. fUS could help in evaluation of hemodynamic response during electrode placement in order to optimize leads location for neuromodulation therapies and for intraoperative monitoring of spinal cord hemodynamics during surgical procedures. Finally, fUS may help to generate important information about spinal cord functional organization, and particularly, could help to trace circuitry response during pharmacological interventions and neuromodulation.

It is one aspect of the present disclosure to implement fUS in order to guide the placement of electrodes or other medical instruments, devices, or implants onto specific segments of the spinal cord. For instance, fUS can be implemented to guide epidural electrode placement onto a specific segment of the spinal cord for use in spinal cord injury and pain treatment.

It is another aspect of the present disclosure to implement fUS in order to generate vascular maps for use in safely guiding the implantation of intraspinal stimulation electrodes.

It is another aspect of the present disclosure to implement fUS in order to optimize stimulation parameters (e.g., intensity, frequency, pulse width, burst versus continuous stimulation, electrode configuration) for a spinal cord stimulation system. Advantageously, electromyography ("EMG") data do not need to be acquired when using fUS to optimize the stimulation parameters. For instance, fUS can be used to optimize stimulation parameters in the operating room setting when muscle relaxant is used (i.e., without needing to rely on EMG response, which is affected by the muscle relaxant used in the surgical procedure).

It is a discovery of the present disclosure that fUS has a higher sensitivity in monitoring spinal cord response than electromyography. As such, fUS imaging can replace electromyography in the evaluation of electrode implantation to optimize leads location for neuromodulation therapies and for intraoperative monitoring.

It is another aspect of the present disclosure to implement fUS as part of a closed-loop stimulation system for spinal cord stimulation. In these implementations, fUS-measured hemodynamic response data are input to the closed-loop stimulation system, generating output as updated stimulation parameters (e.g., intensity, frequency, pulse width, burst versus continuous stimulation, electrode configuration) for the spinal cord stimulation system.

Referring now to FIG. 1, a flowchart is illustrated as setting forth the steps of an example method for images or parameter maps using fUS. The method includes acquiring fUS data from a region-of-interest using an ultrasound system, as indicated at step 102. In general, the region-of-interest contains at least a portion of the subject's spinal cord. As one example, the region-of-interest can be selected to align with the longitudinal dimension of the spinal cord and intersect with the central canal. In instances where electrodes are already in place in the subject, the region-of-interest can be selected to be adjacent one or more of these electrodes.

In some implementations, the fUS data are acquired while neuromodulation is applied to the subject's spinal cord. Neuromodulation may include electrical stimulation of the spinal cord or other portions of the subject's nervous system that result in neuromodulation of the spinal cord. In other examples, neuromodulation may be implemented using magnetic stimulation, pharmaceutical modulation, or other neuromodulation techniques. In still other implementations, the fUS data can be acquired while the subject is performing a functional task, such as a motor task.

As one non-limiting example, the fUS data can be acquired using a compounding plane wave imaging sequence, such as an ultrafast compounding place wave imaging sequence. Alternatively, other ultrasound imaging sequences can be implemented. Preferably, the ultrasound imaging sequence will have a temporal resolution sufficient to image hemodynamic response.

In a non-limiting example of ultrafast compounding plane wave imaging, multiple different steered plane waves are transmitted. For instance, five steered plane waves (e.g., −4 degrees to +4 degrees, with 2 degrees of step angle) can be transmitted, Each steering angle can be repeatedly transmitted (e.g., repeated three times) to boost signal-to-noise-ratio ("SNR"), Using five steering angles each repeated three times results in a compounding scheme that has an equivalent SNR performance to a conventional 15-angle compounding sequence, but reduces the beamforming computational cost by a factor of three.

In one implementation of this non-limiting example, a pulse repetition interval of 35 µs (corresponding to a pulse repetition frequency ("PRF") of 28.6 kHz) can be used, which results in a total time cost of 525 µs for transmitting and receiving all 15 transmissions. To satisfy a post-compounding PRF of 500 Hz, a 1,475 µs no-op time can be added to each group of compounding transmissions. After coherent compounding, high quality fUS data are obtained. These fUS data can be used as Doppler ensembles for future processing. In this non-limiting example, a total of 200 Doppler ensembles (400 ms duration) can be collected within each second to produce one power Doppler ("PD") image per second.

After the fUS data are acquired, they may be pre-processed, as indicated at step 104. Pre-processing may include, among other things, motion correction and tissue clutter filtering.

In one non-limiting example, a robust and fast sub-pixel motion correction algorithm can be used to remove tissue and/or physiological motion, such as tissue motion induced by breathing and spinal cord stimulation. Motion correction can be applied both on the original fUS data (e.g., high frame-rate ultrasound data) before clutter filtering and on the PD images after clutter filtering.

Motion correction can be implemented based on principles of phase correlation-based sub-pixel registration. Briefly, an analytical solution of the phase correlation function between images that are shifted by non-integer number of pixels ($\Delta x$, $\Delta z$) can be derived and the main peak and side peaks of the inverse Fourier transform of this phase correlation function (C) can be used to calculate the sub-pixel displacement:

$$\Delta x = \frac{C(1, 0)}{C(1, 0) \pm C(0, 0)}; \quad (1)$$

$$\Delta z = \frac{C(0, 1)}{C(0, 1) \pm C(0, 0)}; \quad (2)$$

where C(0,0) indicates the main peak (i.e., location of the pixel with highest positive pixel value) and C(1,0) and C(0,1) indicate the side peaks (i.e., locations of the pixel with second highest positive pixel value) along the x-dimension and z-dimension, respectively. To improve the robustness of Eqns. (1) and (2) for ultrasound applications, additional measurements of $\Delta x'$ and $\Delta z'$ are calculated using the main peak and side peaks with highest negative pixel value:

$$\Delta x' = \frac{C(-1, 0)}{-C(-1, 0) \pm C(0, 0)}; \quad (3)$$

$$\Delta z' = \frac{C(0, -1)}{-C(0, -1) \pm C(0, 0)}. \quad (4)$$

Then, an average sub-pixel displacement can be calculated using the results from Eqns. (1)-(4).

Other sub-pixel motion estimation algorithms typically require heavy upsampling of ultrasound signals in order to measure the subpixel motion between frames. In fUS imaging, such an up-sampling procedure can be extremely computationally expensive due to the large amount of ultrasound data acquired in the temporal dimension. In contrast, the sub-pixel motion estimation algorithm described above does not require up-sampling and involves a Fourier transform, which can be executed at extremely fast speed. Therefore, the computational cost can be greatly reduced with the method described above.

Figure 2A:
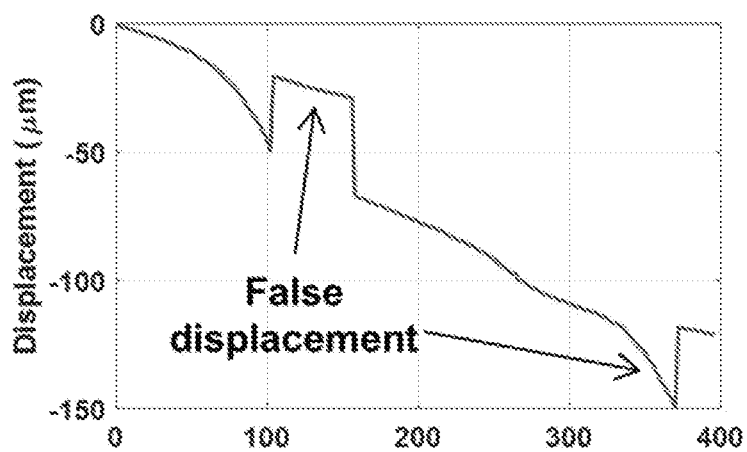
FIG. 2A is an example of a displacement curve in which false motion calculations are present.
Figure 2B:
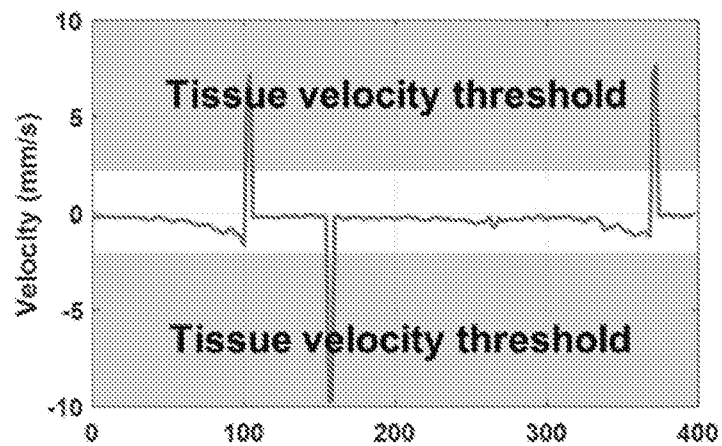
FIG. 2B is an example of a velocity curve computed from the displacement curve of FIG. 2A.
Figure 2C:
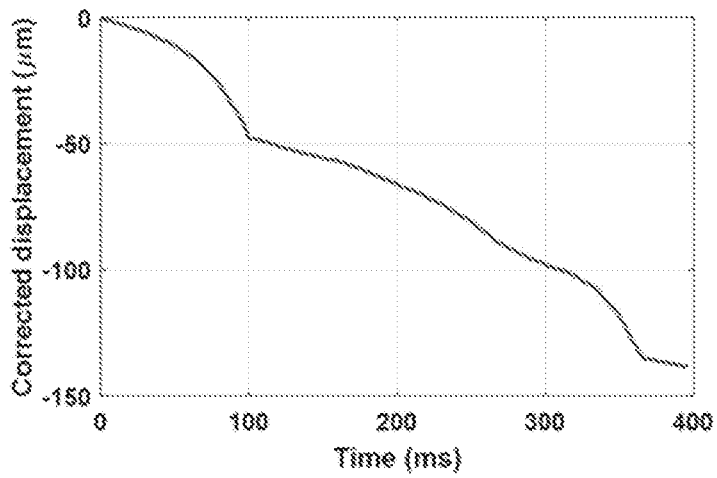
FIG. 2C is an example of an updated displacement curve that is generated after filtering the velocity curve of FIG. 2B.

To further improve the robustness of sub-pixel displacement estimation and suppress false calculations, a tissue velocity curve can be derived by taking a derivative of the original displacement curve, such as the displacement curve shown in FIG. 2A. Then, a tissue velocity thresholding (e.g., a cutoff such as 2 mm/s, or other empirically determined cutoff; can be used) can be applied to the velocity curve to reject high speed values, as shown in FIG. 2B. An integral calculation can then be used to recover the displacement curve, as shown in FIG. 2C. False displacement could be effectively removed by this process.

Additionally or alternatively, to avoid creating streaking artifacts associated with applying a phase-shift to the Fourier spectrum (due to bandlimited data), a gridded data interpolation can be used to register the moved ultrasound frames.

Tissue clutter filtering can be implemented using suitable techniques, such as a spatiotemporal SVD-based ultrasound clutter filter, in order to suppress tissue clutter and extract micro-vessel signals. As one non-limiting example, an accelerated SVD method can be used for tissue clutter filtering, such as those described in co-pending U.S. Patent Application No. US 2018/0220997 and U.S. Patent Application No. US 2019/0053780, which is herein incorporated by reference in its entirety. Additionally or alternatively, a noise equalization technique can also be implemented, such as those described in co-pending U.S. Patent Application No. US 2019/0053780, which is incorporated by reference in its entirety.

In one example implementation, for the first 200 ultrasound ensembles in each trial, a full SVD can be calculated to determine a low-cutoff singular value threshold for tissue rejection and derive a noise field for noise equalization. The same low-cutoff value and noise field can be used for the rest of the ultrasound data in the trial.

As one non-limiting example, after coherent compounding, B-mode ultrasound images can be processed with phase correlation based sub-pixel motion registration and SVD-based clutter filtering to accumulate one frame of power Doppler image in each time point (e.g., each second), k, $$PD(k) = \frac{1}{N}\sum_{i=1}^{N} I_B^2((k-1) \times N + t_i) \text{ for } k = i, 2, \ldots, K; \quad (5)$$

where $I_B$ is the intensity of a filtered B-mode ultrasound image. In one example implementation, the B-mode ultrasound images can be acquired at 500 Hz after spatial compounding. As one example, the ensemble number can be N=200 and the number of time points can be K=120, where each time point may correspond to one second.

Hemodynamic response data are next generated from the pre-processed fUS data, as indicated at step 106. In general, ultrasound power Doppler signal measures the backscattering power of the moving blood, which reflects the blood volume at the interrogated location (e.g., each imaging pixel). The spinal cord blood volume change ($\Delta$SCBV) can be estimated as the percentage of power Doppler ("PD") signal variation compared to the baseline:

$$\Delta SCBV = \frac{PD_{stim} - PD_{baseline}}{PD_{baseline}} \times 100\%. \quad (6)$$

Figure 3:
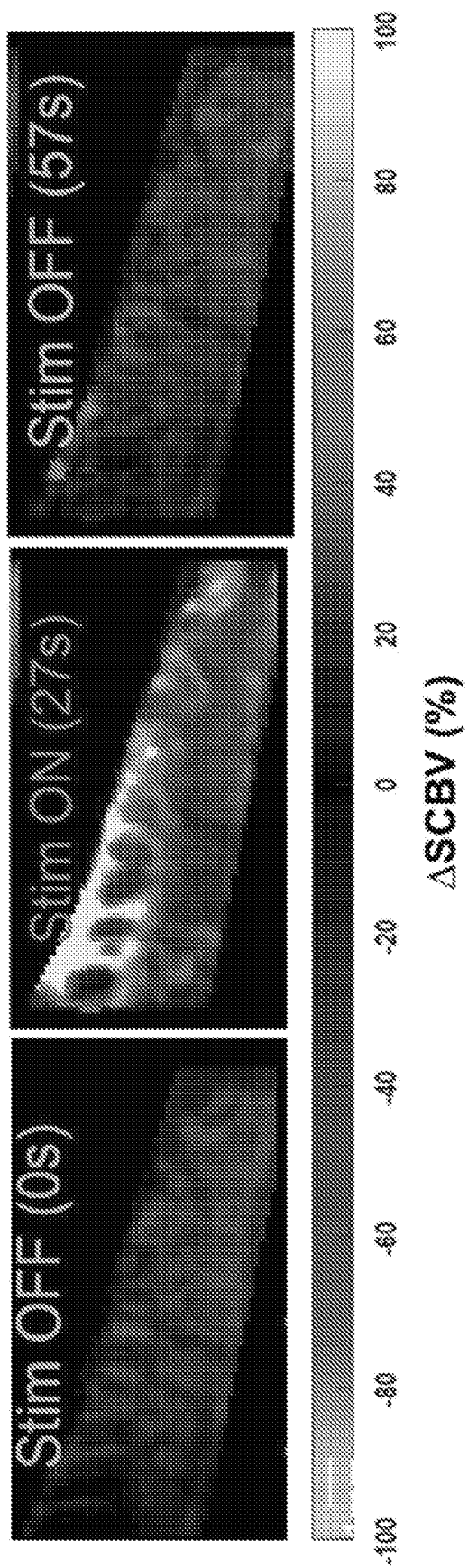
FIG. 3 is an example of hemodynamic response maps obtained for a spinal cord.

In one non-limiting example, a Savitzky-Golay smoothing filter (e.g., window length=11, order=1) or other suitable smoothing filter can be applied to the $\Delta SCBV$ measurement for each imaging pixel along the temporal direction to remove noise. Measurements of $\Delta SCBV$ with amplitude smaller than twice the standard deviation of the baseline fluctuations can be rejected. The remaining $\Delta SCBV$ measurements can be color-coded and superimposed on the PD images. Examples of spinal cord hemodynamic response maps are shown in FIG. 3.

For quantitative local $\Delta SCBV$ measurements, one or more regions-of-interest ("ROIs") can be selected. For instance, four ROIs can be selected: one for the rostral-dorsal, one for the rostral-ventral, one for the caudal-dorsal, and one for the caudal-ventral sections of the spinal cord. For each ROI, the average $\Delta SCBV$ can be calculated using all pixels inside the ROI for each time point.

Figure 4:
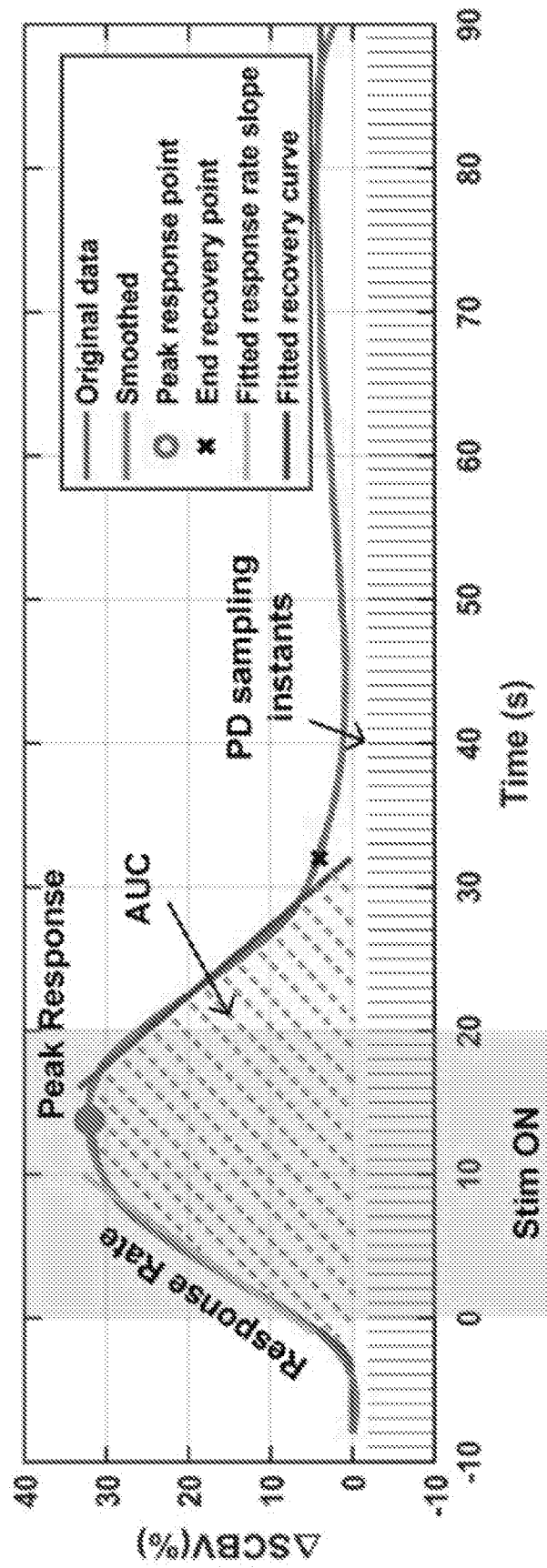
FIG. 4 is an example of hemodynamic response data representative of a change in spinal cord blood volume over time.

Then, the $\Delta SCBV$ curves from the repeated spinal cord stimulation trials can be averaged and smoothed (e.g., by a Savitzky-Golay filter with 5th order and 21-sample window length) for quantitative measurements, as indicated by the blue and the orange curve in FIG. 4, respectively.

From the hemodynamic response data (e.g., the $\Delta SCBV$ measurements), one or more parametric maps can be generated, as indicated at step 108. As one non-limiting example, four parameters and/or corresponding parametric maps can be generating, including the peak response, ascending slope of the response curve (i.e., response rate), area under the response curve ("AURC"), and the recovery time were derived from the $\Delta SCBV$ curve. For response rate, a linear fitting can be performed on the ascending portion of the $\Delta SCBV$ curve in order to calculate the slope (indicated by the yellow curve in FIG. 4). To determine the end point of the spinal cord stimulation response and spinal cord recovery, a linear fitting can be performed on the descending portion of the $\Delta SCBV$ curve, and the point where the fitted line intersects with the zero $\Delta SCBV$ axis can be used as the end recovery point (indicated by the cross sign in FIG. 4). The time interval between peak response and end recovery point can be calculated as the recovery time. The total area under the curve between the onset of spinal cord stimulation and the end recovery point can be calculated as AURC, which reflects the total spinal blood volume variations within the imaging FOV in response to spinal cord stimulation.

Thus, the systems and method described in the present disclosure provide for an optimized work flow of using fUS to map local spinal cord hemodynamic response, which advantageously may be done during a procedure, such as during epidural electrical stimulation. As mentioned above, these techniques can be implemented in a number of different clinical applications.

As one non-limiting example, fUS can be implemented in order to guide the placement of electrodes or other medical instruments, devices, or implants onto specific segments of the spinal cord. For instance, fUS can be implemented to guide epidural electrode placement onto a specific segment of the spinal cord for use in spinal cord injury and pain treatment. As another non-limiting example, fUS can be implemented to guide safe implantation of intraspinal stimulation electrodes. Additionally or alternatively, fUS can be implemented in other surgical navigation or surgical guidance applications.

In these instances, fUS can be performed to provide vascular maps or other functional or parametric maps that can be derived from fUS data. These maps provide information about clinically relevant regions in the spinal cord, which can be used to safely and effectively guide the placement of electrodes or other surgical implants or medical devices. For instance, maps derived or otherwise generated from fUS data can be used to identify functionally active regions of the spinal cord that should be targeted for effective neuromodulation. Similarly, maps derived or otherwise generated from fUS data can be used to identify regions of the spinal cord that should be avoided for patient safety.

As another non-limiting example, fUS can be implemented in order to optimize stimulation parameters (e.g., intensity, frequency, pulse width, burst versus continuous stimulation, electrode configuration) for a spinal cord stimulation system. In these instances, fUS can be performed to provide vascular maps or other functional or parametric maps that can be derived from fUS data acquired while providing stimulation to the spinal cord using a spinal cord stimulation system. The measured functional response from the stimulation can then be used to update or adjust the stimulation parameters as necessary or desired to achieve the desired therapeutic effect.

For instance, the functional response can be compared relative to baseline, reference, or normative data in order to assess the efficacy of the stimulation being provided at the presently selected stimulation parameters. When the functional response varies from the desired effect by a selected amount, the stimulation parameters can be adjusted and a new functional response recorded in order to assess the efficacy of the new stimulation parameters. This process can be performed in real-time in the operating room setting when implanting the electrodes, or can be performed in the clinic to routinely update or adjust the stimulation parameters of an already implanted spinal cord stimulation system.

As still another non-limiting example, fUS can be implemented as part of a closed-loop stimulation system for spinal cord stimulation. In these implementations, fUS-measured hemodynamic response data are input to the closed-loop stimulation system, generating output as updated stimulation parameters for the spinal cord stimulation system. An example of such a system is described in more detail below.

The systems and methods described in the present disclosure are capable of indicating a coupling between the spinal cord hemodynamics and spinal circuits activated by SCS at low frequencies (e.g., 20-40 Hz) compared to high frequencies (200-500 Hz), which further indicates that different settings of SCS may activate different mechanisms and/or different components of the spinal circuitry. This coupling between the spinal cord hemodynamics and the neuronal activity facilitated at a frequency range of, for example, 20-40 Hz, can be implemented to facilitate spinal circuitry to maintain optimal stepping patterns with SCS at the similar frequency range.

Thus, in one aspect, the systems and methods described in the present disclosure can be implemented to accurately place spinal leads, or an array, at a desired location. In these instances, a spinal cord stimulation lead or array location can be determined with certainty by recording and analyzing the subject's hemodynamic response during electrical stimulation. This requires the subject to not be under the use of muscle relaxant. The fUS systems and methods described in the present disclosure can be utilized to guide placing spinal lead or array at the correct location to target the spinal cord or to place the lead or array at the midline of the spinal cord to have equal bilateral effect.

Figures 5A, 5B, 5C, 5D:
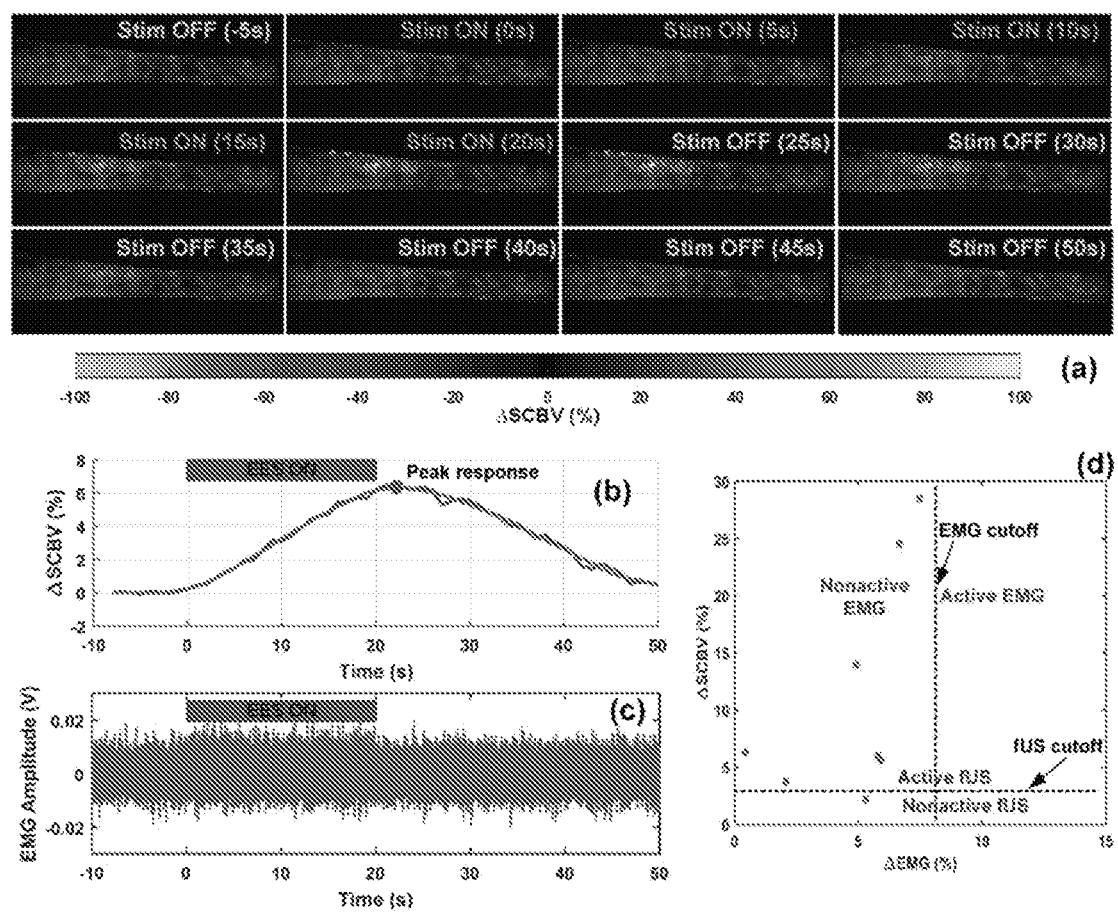
FIGS. 5A-5D show an example of using fUS as a sensitive technique to monitor the hemodynamic response of the spinal cord even during subthreshold EES intensities (i.e., silent EMG).

FIGS. 5A-5D show an example of using fUS as a sensitive technique to monitor the hemodynamic response of the spinal cord even during subthreshold EES intensities (i.e., silent EMG). FIG. 5A shows examples of spinal cord blood volume change (ΔSCBV) data color coded on the Power Doppler ("PD") images at several point times. FIGS. 5B and 5C show ΔSCBV curves and ΔEMG signals, respectively, for an example case with sub-threshold EES and silent EMG. FIG. 5D shows a plot of ΔSCBV peak response versus ΔEMG for example cases with silent EMG signals.

In another aspect, the systems and methods described in the present disclosure can be implemented to optimize the selection of stimulation electrodes to use when applying electrical stimulation to a subject. For instance, fUS can be used in combination with other imaging modalities (e.g., ultrasound, CT, x-ray, MRI) to locate spinal cord structures (e.g., rootlets, specific fibers, specific regions) and place or select the electrodes that generate electric fields to target those structures and optimize stimulation parameters. Thus, in some instances a subset of available electrodes can be selected and used for stimulation based on feedback obtained from the fUS data. In other instances, the stimulation parameters can be optimized such that different electrodes receive different stimulation parameters, thereby creating a spatially modulated electrical stimulation based on feedback obtained from the fUS data. In some implementations, a large size fUS probe can be used after performing laminectomy. In other implementations, a miniature fUS probe can be used by inserting it into the epidural space. In still other implementations, ultrasound imaging techniques that are capable of imaging through the vertebrae can also be used.

As noted above, in still another aspect, the systems and methods described in the present disclosure can be implemented to optimize stimulation parameters for use with controlling a spinal cord stimulation system to generate electrical stimulation. In current clinical practice of spinal cord stimulation (e.g., for pain management and treatment of spinal cord injury, Parkinson's Disease, and other disorders), stimulation parameters are determined based on paresthesia feedback from patients or by analyzing evoked EMG response. The systems and methods described in the present disclosure can implement fUS, which is sensitive to different stimulation frequency, voltage, and pulse width, in order to optimize stimulation parameters without the use of paresthesia or requiring detailed analysis EMG.

Figure 6:
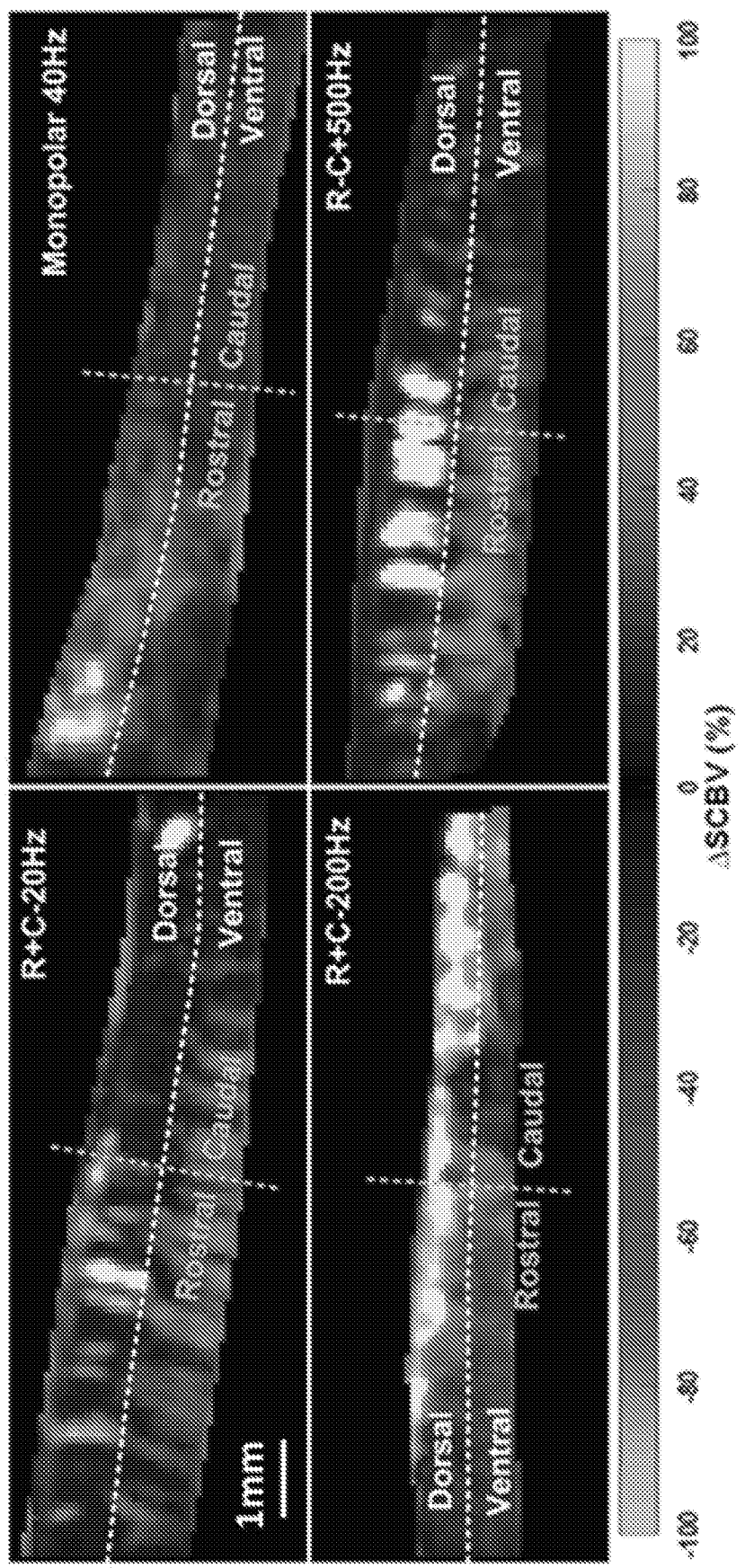
FIG. 6 illustrates representative examples of hemodynamic response images with different EES parameters and electrode configurations. The four fUS images in this example were collected from supra-threshold intensities, different stimulation frequencies (20 Hz, 40 Hz, 200 Hz, and 500 Hz) and electrode configurations (monopolar, bipolar R+C−, and bipolar R−C+). The ultrasound FOV was divided in dorsal and ventral regions by the white dashed line, and to the rostral and caudal regions with the green dashed line.

For example, FIG. 6 illustrates representative examples of hemodynamic response images with different EES parameters and electrode configurations. The four MS images in this example were collected from supra-threshold intensities, different stimulation frequencies (20 Hz, 40 Hz, 200 Hz, and 500 Hz) and electrode configurations (monopolar, bipolar R+C−, and bipolar R−C+). The ultrasound FOV was divided in dorsal and ventral regions by the white dashed line, and to the rostral and caudal regions with the green dashed line. These example hemodynamic response images indicate how differences in stimulation parameters will evoke different hemodynamics responses, which can be measured using fUS. Thus, by implementing the systems and methods described in the present disclosure, measurements of hemodynamic response using fUS can be used to optimize a selections of stimulation parameters for spinal cord stimulation.

In yet another aspect, the systems and methods described in the present disclosure can be implemented to determine spatial hemodynamic response of deep spinal cord structures. For instance, fUS imaging can be used to determine hemodynamic response of the entire depth of the spinal cord with high spatial and temporal resolution. Current imaging modalities lack the depth penetration or resolution to achieve this technical result, and can also be too slow to capture transient responses. This implementation of fUS can be used to investigate electrical stimulation response, basic science research, or to diagnose disease based on hemodynamic response measurement of deep spinal cord structures. For example, FIG. 6 illustrates the measurement of hemodynamic response of dorsal versus ventral, or rostral versus caudal regions of the electrode throughout the spinal cord structure.

The fUS systems and methods described in the present disclosure can also be implemented to study hemodynamics related to the neural circuits involved into regulation of autonomic functions and particularly in regulation of the blood pressure, bladder, and bowel function.

As noted above, the systems and methods described in the present disclosure can also be implemented to provide closed-loop spinal cord stimulation. Because fUS images are not susceptible to electrical artifacts, these images can advantageously be used in closed-loop spinal cord stimulation by inputting fUS-measured hemodynamic response and alternating stimulation parameters frequency, voltage, current) in real-time or pseudo real-time. This could be applicable in applications of spinal cord stimulation for pain management, spinal cord injury, Parkinson's disease, and so on.

Figure 7:
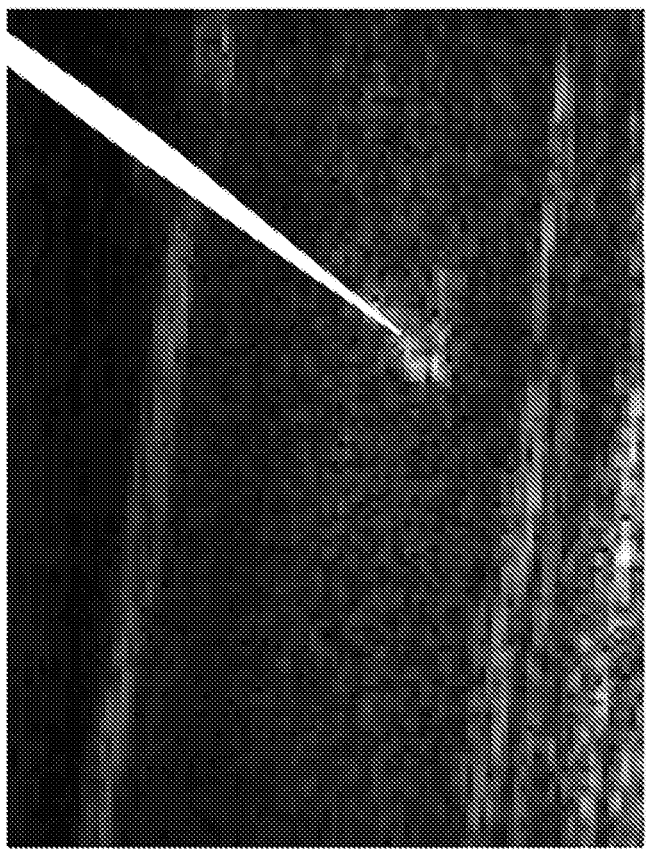
FIG. 7 shows an intraspinal electrode inserted into a rat spinal cord and vascular map of the surrounding spinal cord region.
Figure 7:
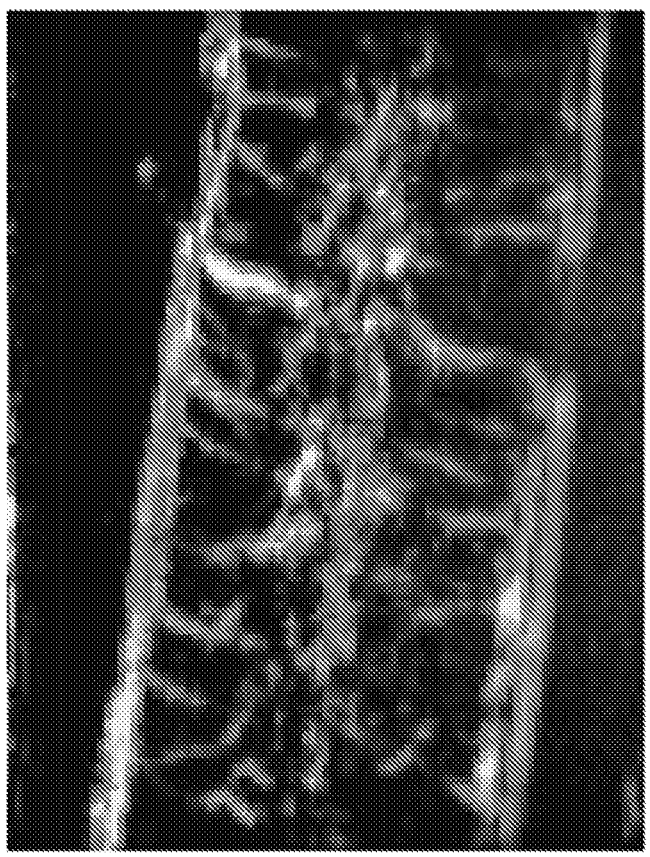

As another example, the systems and methods described in the present disclosure can be implemented to generate vascular maps for safe implantation of intraspinal stimulation electrodes. Damaging vascular structures in spinal cord leads to inflammatory response and subsequent formation of tissue encapsulation around the electrode. By creating a detailed map of spinal cord vasculature pre-insertion and inserting intraspinal electrodes under real-time fUS guidance, major vascular structures can be avoided. For instance, FIG. 7 shows an example where an intraspinal electrode has been safely inserted into a rat spinal cord based on feedback obtained from a vascular map of the surrounding spinal cord region. In addition, the effectiveness of the electrode can be assessed by observing the hemodynamic response evoked by stimulation.

In still another example, the systems and methods described in the present disclosure can be implemented to perform functional assessment during an interventional procedure. In these instances, fUS imaging of spinal cord can be utilized to perform functional assessment of spinal cord vasculature and hemodynamic response during spinal cord vascular intervention procedures or intervention procedures at the epidural space or inside spinal cord.

The systems and methods described in the present disclosure can also be implemented to determine or otherwise assess the severity of spinal cord injury. As one non-limiting example, spinal cord injury progress through secondary sublesional injury might involve disruption of vasculature or hemodynamic response. Functional assessment of these structures or blood flow using fUS can reveal information about the severity of the trauma and progression of the subsequent inflammatory response, which can be used to not only assess the severity of spinal cord injury, but can help determine an appropriate intervention strategy.

In other aspects, the systems and methods described in the present disclosure can be implemented to determine functional supraspinal influence after spinal cord injury. Novel therapies like epidural electrical stimulation can restore locomotion in patients paralyzed due to severe spinal cord injury. The effectiveness of epidural stimulation or other intervention can depend on the level of remaining tracts through the injury site, which in some instances might not be enough to generate motor response or provide sensation. Because fUS is more sensitive than electromyography, it can be utilized to assess the level of remaining supraspinal fiber/influence by tracking the hemodynamic response of spinal cord below the level of injury during functional tasks or external stimulation of brains or peripheral nerve or musculature.

As still another example, the systems and methods described in the present disclosure can be implemented to provide functional assessment of spinal cord during disease progression. Neurodegenerative diseases including, multiple sclerosis, Parkinson's disease, chronic neuropathic pain, and spinal cord injury can cause functional alteration of spinal cord vasculature, anatomy, and hemodynamic flow in the spinal cord. fUS can provide sensitive tracking of spinal cord structures and provide early diagnosis of neurodegenerative diseases, which deteriorate spinal cord regions and provide appropriate intervention. This can provide a sensitive tool for novel drug or therapy development for neurodegenerative diseases.

Figure 8:
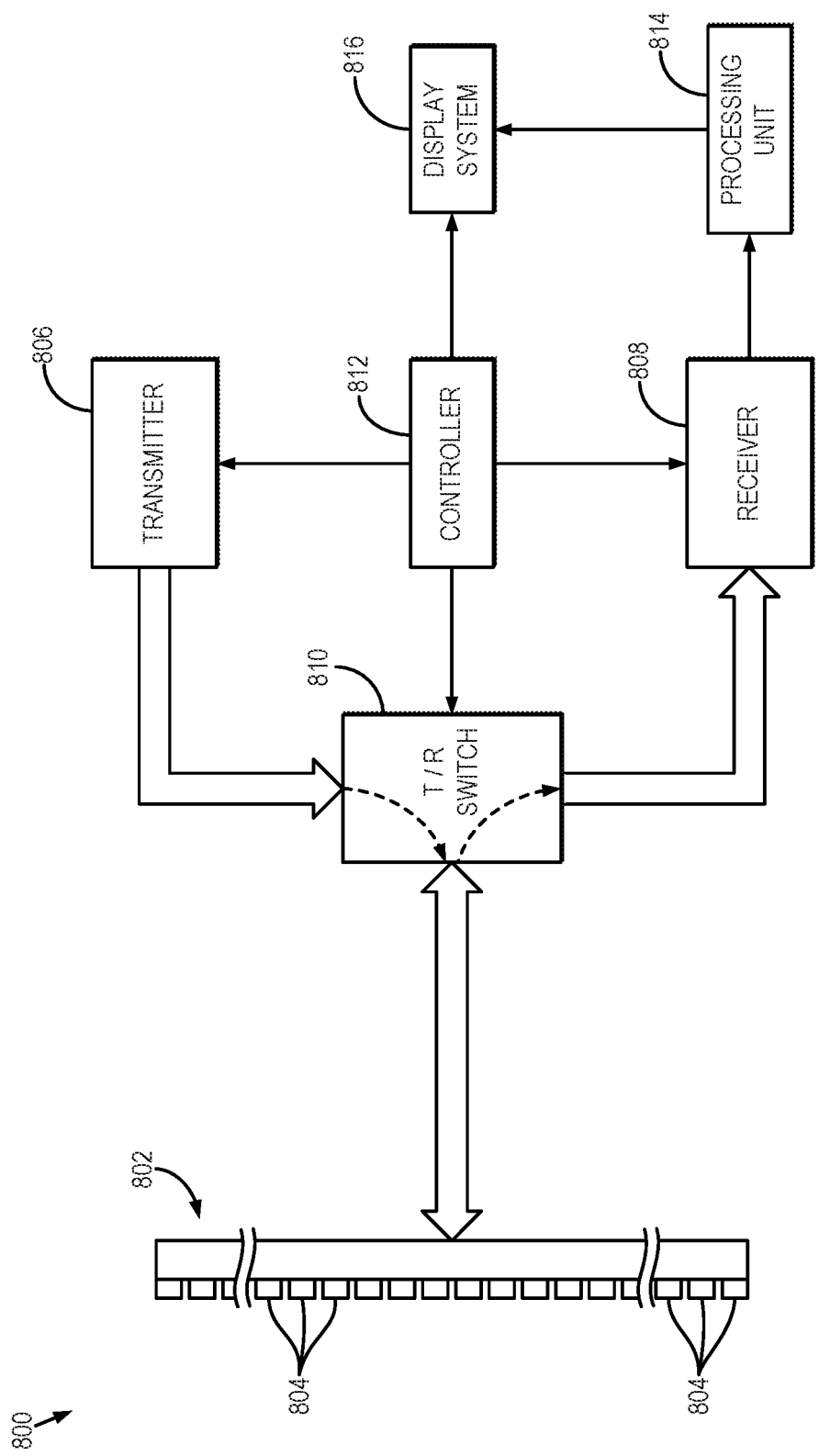
FIG. 8 is a block diagram of an example ultrasound system that can implement the methods described in the present disclosure.

FIG. 8 illustrates an example of an ultrasound system 800 that can implement the methods described in the present disclosure. The ultrasound system 800 includes a transducer array 802 that includes a plurality of separately driven transducer elements 804. The transducer array 802 can include any suitable ultrasound transducer array, including linear arrays, curved arrays, phased arrays, and so on. Similarly, the transducer array 802 can include a 1D transducer, a 1.5D transducer, a 1.75D transducer, a 2D transducer, a 3D transducer, and so on.

When energized by a transmitter 806, a given transducer element 804 produces a burst of ultrasonic energy. The ultrasonic energy reflected back to the transducer array 802 (e.g., an echo) from the object or subject under study is converted to an electrical signal (e.g., an echo signal) by each transducer element 804 and can be applied separately to a receiver 808 through a set of switches 810. The transmitter 806, receiver 808, and switches 810 are operated under the control of a controller 812, which may include one or more processors. As one example, the controller 812 can include a computer system.

The transmitter 806 can be programmed to transmit unfocused or focused ultrasound waves. In some configurations, the transmitter 806 can also be programmed to transmit diverged waves, spherical waves, cylindrical waves, plane waves, or combinations thereof. Furthermore, the transmitter 806 can be programmed to transmit spatially or temporally encoded pulses.

The receiver 808 can be programmed to implement a suitable detection sequence for the imaging task at hand. In some embodiments, the detection sequence can include one or more of line-by-line scanning, compounding plane wave imaging, synthetic aperture imaging, and compounding diverging beam imaging.

In some configurations, the transmitter 806 and the receiver 808 can be programmed to implement a high frame rate. For instance, a frame rate associated with an acquisition pulse repetition frequency ("PRF") of at least 100 can be implemented. In some configurations, the ultrasound system 800 can sample and store at least one hundred ensembles of echo signals in the temporal direction.

A scan can be performed by setting the switches 810 to their transmit position, thereby directing the transmitter 806 to be turned on momentarily to energize transducer elements 804 during one or more transmission events according to a selected imaging sequence. The switches 810 can then be set to their receive position and the subsequent echo signals produced by the transducer elements 804 in response to one or more detected echoes are measured and applied to the receiver 808, The separate echo signals from the transducer elements 804 can be combined in the receiver 808 to produce a single echo signal.

The echo signals are communicated to a processing unit 814, which may be implemented by a hardware processor and memory, to process echo signals or images generated from echo signals. As an example, the processing unit 814 can generate hemodynamic response data, functional maps, or other parametric maps using the methods described in the present disclosure. In some implementations, the processing unit 814 can also calculate or otherwise estimate optimized stimulation parameters, as described above. Additionally or alternatively, the processing unit 814 can output data to another computer system where these operations can be performed. Images produced from the echo signals by the processing unit 814 can be displayed on a display system 816.

Figure 9:
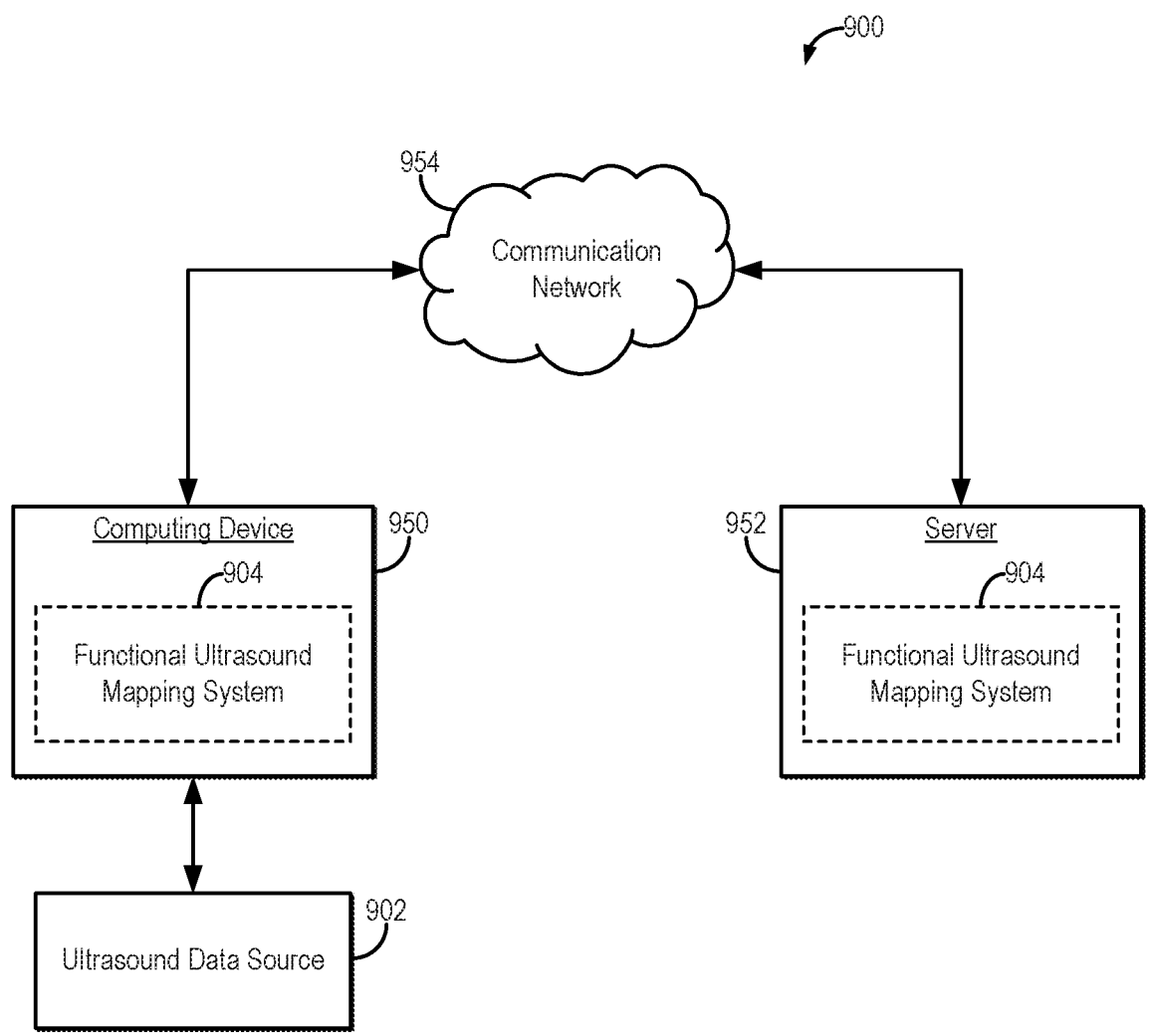
FIG. 9 is a block diagram of an example functional ultrasound mapping system.

Referring now to FIG. 9, an example of a system 900 for generating hemodynamic response data from ultrasound data, and using that data to implement surgical navigation or for updating or adjusting spinal cord stimulation parameters (e.g., intensity, frequency, pulse width, burst versus continuous stimulation, electrode configuration) in accordance with some embodiments of the systems and methods described in the present disclosure is shown. As shown in FIG. 9, a computing device 950 can receive one or more types of data (e.g., fUS data) from ultrasound data source 902, which may be an ultrasound system. In some embodiments, computing device 950 can execute at least a portion of a functional ultrasound mapping system 904 to generate hemodynamic response data from ultrasound data received from the ultrasound data source 902.

Additionally or alternatively, in some embodiments, the computing device 950 can communicate information about data received from the ultrasound data source 902 to a server 952 over a communication network 954, which can execute at least a portion of the functional ultrasound mapping system 904. In such embodiments, the server 952 can return information to the computing device 950 (and/or any other suitable computing device) indicative of an output of the functional ultrasound mapping system 904.

In some embodiments, computing device 950 and/or server 952 can be any suitable computing device or combination of devices, such as a desktop computer, a laptop computer, a smartphone, a tablet computer, a wearable computer, a server computer, a virtual machine being executed by a physical computing device, and so on. The computing device 950 and/or server 952 can also reconstruct images from the data.

In some embodiments, ultrasound data source 902 can be any suitable source of image data (e.g., measurement data, images reconstructed from measurement data), such as an ultrasound system, another computing device (e.g., a server storing image data), and so on. In some embodiments, ultrasound data source 902 can be local to computing device 950. For example, ultrasound data source 902 can be incorporated with computing device 950 (e.g., computing device 950 can be configured as part of a device for capturing, scanning, and/or storing images). As another example, ultrasound data source 902 can be connected to computing device 950 by a cable, a direct wireless link, and so on, Additionally or alternatively, in some embodiments, ultrasound data source 902 can be located locally and/or remotely from computing device 950, and can communicate data to computing device 950 (and/or server 952) via a communication network (e.g., communication network 954).

In some embodiments, communication network 954 can be any suitable communication network or combination of communication networks. For example, communication network 954 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), a wired network, and so on. In some embodiments, communication network 954 can be a local area network, a wide area network, a public network (e.g., the Internet), a private or semi-private network (e.g., a corporate or university intranet), any other suitable type of network, or any suitable combination of networks. Communications links shown in FIG. 9 can each be any suitable communications link or combination of communications links, such as wired links, fiber optic links, Wi-Fi links, Bluetooth links, cellular links, and so on.

Figure 10:
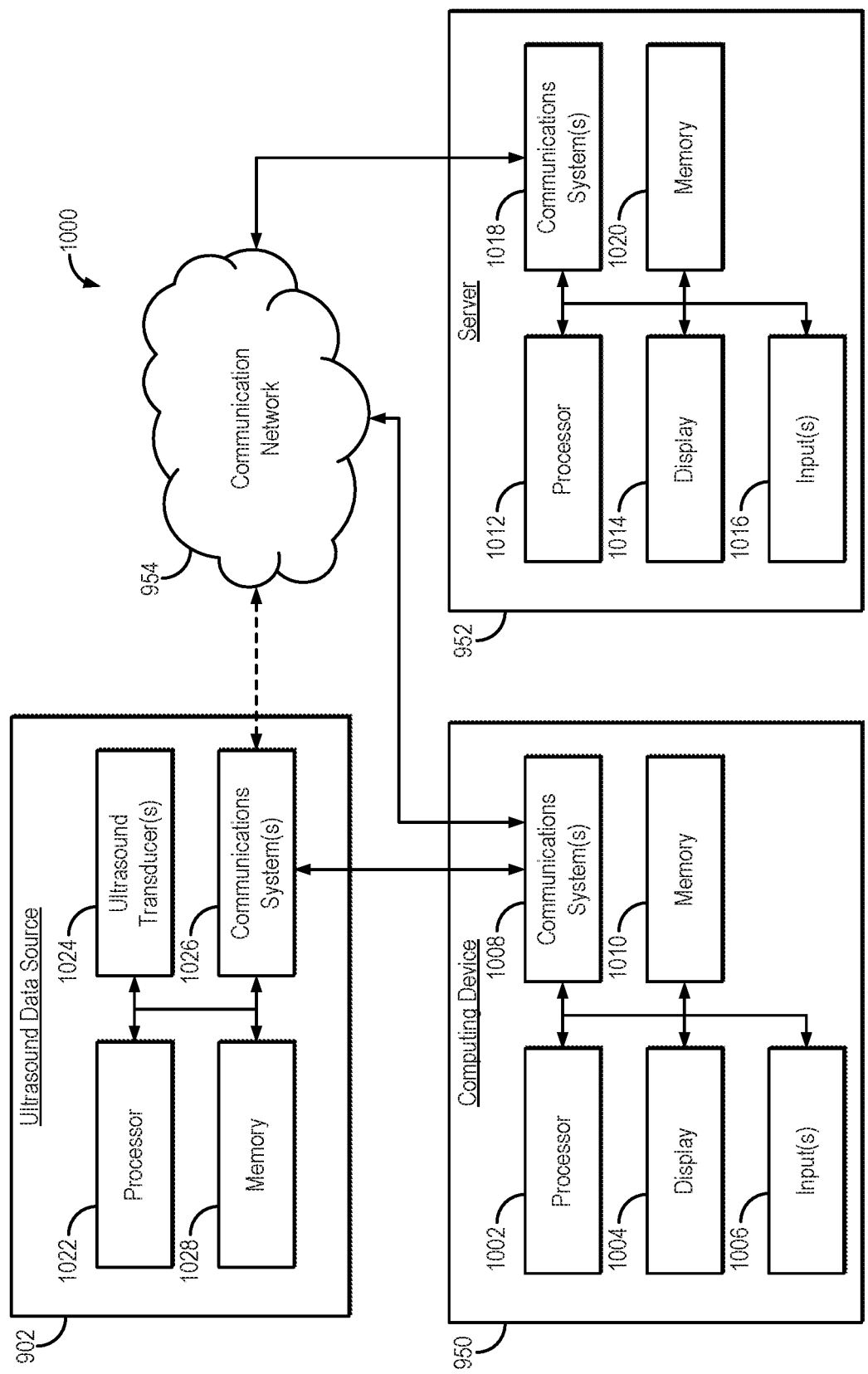
FIG. 10 is a block diagram of example components that can implement the functional ultrasound mapping system of FIG. 9.

Referring now to FIG. 10, an example of hardware 1000 that can be used to implement ultrasound data source 902, computing device 950, and server 952 in accordance with some embodiments of the systems and methods described in the present disclosure is shown. As shown in FIG. 10, in some embodiments, computing device 950 can include a processor 1002, a display 1004, one or more inputs 1006, one or more communication systems 1008, and/or memory 1010. In some embodiments, processor 1002 can be any suitable hardware processor or combination of processors, such as a central processing unit ("CPU"), a graphics processing unit ("GPU"), and so on. In some embodiments, display 1004 can include any suitable display devices, such as a computer monitor, a touchscreen, a television, and so on. In some embodiments, inputs 1006 can include any suitable input devices and/or sensors that can be used to receive user input, such as a keyboard, a mouse, a touchscreen, a microphone, and so on.

In some embodiments, communications systems 1008 can include any suitable hardware, firmware, and/or software for communicating information over communication network 954 and/or any other suitable communication networks. For example, communications systems 1008 can include one or more transceivers, one or more communication chips and/or chip sets, and so on. In a more particular example, communications systems 1008 can include hardware, firmware and/or software that can be used to establish a Wi-Fi connection, a Bluetooth connection, a cellular connection, an Ethernet connection, and so on.

In some embodiments, memory 1010 can include any suitable storage device or devices that can be used to store instructions, values, data, or the like, that can be used, for example, by processor 1002 to present content using display 1004, to communicate with server 952 via communications system(s) 1008, and so on. Memory 1010 can include any suitable volatile memory, non-volatile memory, storage, or any suitable combination thereof. For example, memory 1010 can include RAM, ROM, EEPROM, one or more flash drives, one or more hard disks, one or more solid state drives, one or more optical drives, and so on. In some embodiments, memory 1010 can have encoded thereon, or otherwise stored therein, a computer program for controlling operation of computing device 950. In such embodiments, processor 1002 can execute at least a portion of the computer program to present content (e.g., images, user interfaces, graphics, tables), receive content from server 952, transmit information to server 952, and so on.

In some embodiments, server 952 can include a processor 1012, a display 1014, one or more inputs 1016, one or more communications systems 1018, and/or memory 1020. In some embodiments, processor 1012 can be any suitable hardware processor or combination of processors, such as a CPU, a GPU, and so on. In some embodiments, display 1014 can include any suitable display devices, such as a computer monitor, a touchscreen, a television, and so on. In some embodiments, inputs 1016 can include any suitable input devices and/or sensors that can be used to receive user input, such as a keyboard, a mouse, a touchscreen, a microphone, and so on.

In some embodiments, communications systems 1018 can include any suitable hardware, firmware, and/or software for communicating information over communication network 954 and/or any other suitable communication networks. For example, communications systems 1018 can include one or more transceivers, one or more communication chips and/or chip sets, and so on. In a more particular example, communications systems 1018 can include hardware, firmware and/or software that can be used to establish a connection, a Bluetooth connection, a cellular connection, an Ethernet connection, and so on.

In some embodiments, memory 1020 can include any suitable storage device or devices that can be used to store instructions, values, data, or the like, that can be used, for example, by processor 1012 to present content using display 1014, to communicate with one or more computing devices 950, and so on. Memory 1020 can include any suitable volatile memory, non-volatile memory, storage, or any suitable combination thereof. For example, memory 1020 can include RAM, ROM, EEPROM, one or more flash drives, one or more hard disks, one or more solid state drives, one or more optical drives, and so on. In some embodiments, memory 1020 can have encoded thereon a server program for controlling operation of server 952. In such embodiments, processor 1012 can execute at least a portion of the server program to transmit information and/or content (e.g., data, images, a user interface) to one or more computing devices 950, receive information and/or content from one or more computing devices 950, receive instructions from one or more devices (e.g., a personal computer, a laptop computer, a tablet computer, a smartphone), and so on.

In some embodiments, ultrasound data source 902 can include a processor 1022, one or more ultrasound transducers 1024, one or more communications systems 1026, and/or memory 1028. In some embodiments, processor 1022 can be any suitable hardware processor or combination of processors, such as a CPU, a GPU, and so on. In some embodiments, the one or more ultrasound transducers 1024 are generally configured to acquire data, images, or both. Additionally or alternatively, in some embodiments, one or more ultrasound transducers 1024 can include any suitable hardware, firmware, and/or software for coupling to and/or controlling operations of the ultrasound transducers. In some embodiments, one or more portions of the ultrasound transducer(s) 1024 can be removable and/or replaceable.

Note that, although not shown, ultrasound data source 902 can include any suitable inputs and/or outputs. For example, ultrasound data source 902 can include input devices and/or sensors that can be used to receive user input, such as a keyboard, a mouse, a touchscreen, a microphone, a trackpad, a trackball, and so on. As another example, ultrasound data source 902 can include any suitable display devices, such as a computer monitor, a touchscreen, a television, etc., one or more speakers, and so on.

In some embodiments, communications systems 1026 can include any suitable hardware, firmware, and/or software for communicating information to computing device 950 (and, in some embodiments, over communication network 954 and/or any other suitable communication networks). For example, communications systems 1026 can include one or more transceivers, one or more communication chips and/or chip sets, and so on. In a more particular example, communications systems 1026 can include hardware, firmware and/or software that can be used to establish a wired connection using any suitable port and/or communication standard (e.g., VGA, DVI video, USB, RS-232, etc.), Wi-Fi connection, a Bluetooth connection, a cellular connection, an Ethernet connection, and so on.

In some embodiments, memory 1028 can include any suitable storage device or devices that can be used to store instructions, values, data, or the like, that can be used, for example, by processor 1022 to control the one or more ultrasound transducers 1024, and/or receive data from the one or more ultrasound transducers 1024; to images from data; present content (e.g., images, a user interface) using a display; communicate with one or more computing devices 950; and so on. Memory 1028 can include any suitable volatile memory, non-volatile memory, storage, or any suitable combination thereof. For example, memory 1028 can include RAM, ROM, EEPROM, one or more flash drives, one or more hard disks, one or more solid state drives, one or more optical drives, and so on. In some embodiments, memory 1028 can have encoded thereon, or otherwise stored therein, a program for controlling operation of ultrasound data source 902. In such embodiments, processor 1022 can execute at least a portion of the program to generate images, transmit information and/or content (e.g., data, images) to one or more computing devices 950, receive information and/or content from one or more computing devices 950, receive instructions from one or more devices (e.g., a personal computer, a laptop computer, a tablet computer, a smartphone, etc.), and so on.

Figure 11:
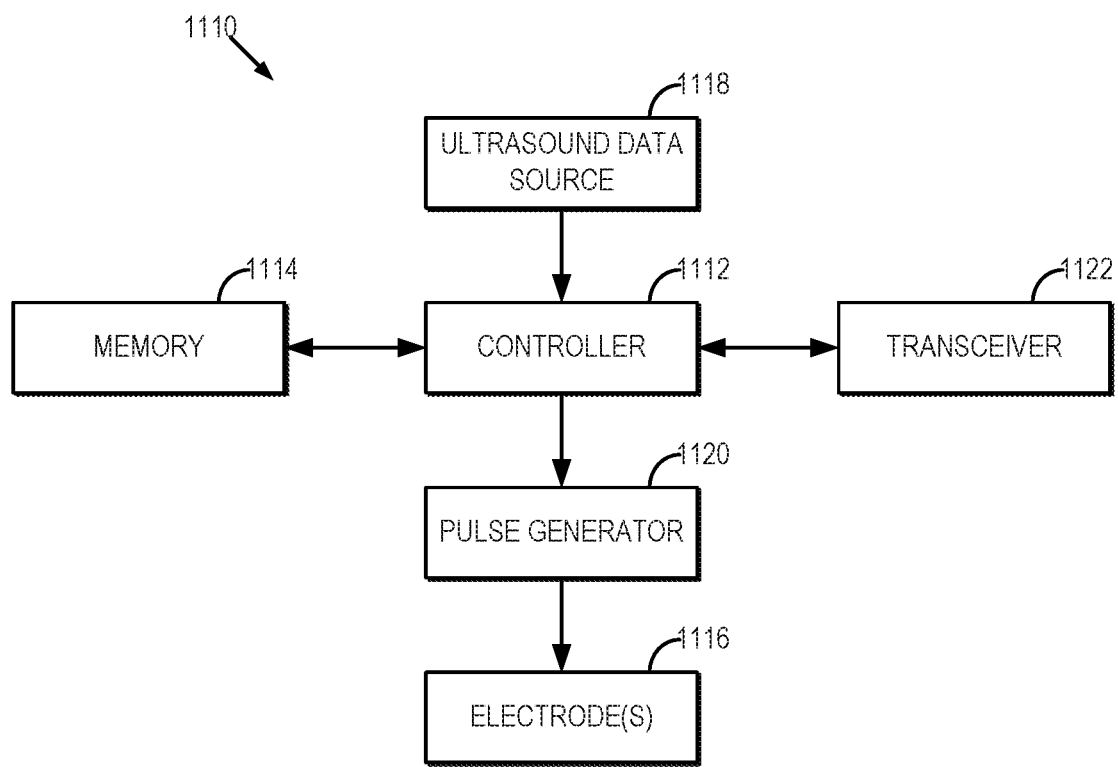
FIG. 11 is a block diagram of an example closed-loop spinal cord stimulation system that can implement embodiments of the methods described in the present disclosure.

Referring now to FIG. 11, an example closed-loop spinal cord stimulation system 1110 that can implement the methods described above is illustrated. In general, the closed-loop spinal cord stimulation system 1110 includes a controller 1112, a memory 1114, and at least one electrode 1116. The closed-loop spinal cord stimulation system 1110 can be implemented as an implantable medical device, such as an implanted spinal cord stimulation system.

In some embodiments, at least one electrode 1116 is capable of both sensing electrophysiological activity and delivering electrical stimulation. Thus, in these embodiments, the at least one electrode 1116 also forms at least one sensor. An ultrasound data source 1118 provides fUS data to the controller 1112. The fUS data may include ultrasound data or other data derived from the ultrasound data, including hemodynamic response data, functional maps, and so on.

The controller 1112 includes a processor to execute instructions embedded in or otherwise stored on the memory 1114 to implement the methods described above. The memory 1114 can also store fUS data and other data (e.g., hemodynamic response data) for processing, as well as settings (e.g., stimulation parameters) to be provided to the controller 1112 for directing the at least one electrode 1116 to provide electrical stimulation to a subject.

At least one electrode 1116 operates under control of the controller 1112 to deliver electrical stimulations to the subject in response thereto. Processing circuitry in the controller 1112 detects and processes fUS data (e.g., hemodynamic response data) received by the ultrasound data source 1118 to determine the optimized stimulation parameters based on the methods and algorithms described above. The optimized stimulation parameters are provided as instructions to a pulse generator 1120, which in response to the instructions provides an electrical signal to the at least one electrode 1116 to deliver the electrical stimulations to the subject.

The closed-loop stimulation system 1110 can also include a transceiver 1122 and associated circuitry for communicating with a programmer or other external or internal device. As one example, the transceiver 1122 can include a telemetry coil.

In operation, the closed-loop stimulation system 1110 receives hemodynamic response data from the ultrasound source 1118, or otherwise computes such data from fUS data received from the ultrasound source 1118. These data are provided to the controller 1112 where they are processed. The controller 1112 analyzes the hemodynamic response data and estimates therefrom optimal stimulation parameters, as described above. The optimized stimulation parameters are provided to the pulse generator 1120 to control the at least one electrode 1116 to generate electrical stimulation that will achieve the desired effect in the subject.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (e.g., hard disks, floppy disks), optical media (e.g., compact discs, digital video discs, Blu-ray discs), semiconductor media (e.g., random access memory ("RAM"), flash memory, electrically programmable read only memory ("EPROM"), electrically erasable programmable read only memory ("EEPROM")), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

The present disclosure has described one or more preferred embodiments, and it should be appreciated that many equivalents, alternatives, variations, and modifications, aside from those expressly stated, are possible and within the scope of the invention.

The invention claimed is:

1. A method for updating electrical stimulation parameters based on data acquired with an ultrasound system, the method comprising:
   (a) accessing ultrasound data with a computer system, the ultrasound data having been acquired with an ultrasound system from a region-of-interest containing a spinal cord of a subject while electrical stimulation was applied to the spinal cord by an electrode;
   (b) generating from the ultrasound data, hemodynamic response data indicative of a hemodynamic response in the spinal cord of the subject, wherein the hemodynamic response data comprise measurements of a spinal cord blood volume change in response to the electrical stimulation applied to the spinal cord;

(c) generating updated stimulation parameters using the hemodynamic response data, the updated stimulation parameters indicating settings for a spinal cord stimulation system for delivering electrical stimulation to the spinal cord of the subject; and (d) generating and delivering the electrical stimulation to the spinal cord of the subject using the electrode of the spinal cord stimulation system by applying the updated stimulation parameters to a pulse generator of the spinal cord stimulation system to generate a stimulation signal that is applied to the electrode in order to cause the electrode to generate the electrical stimulation.

2. The method as recited in claim 1, wherein generating the hemodynamic response data includes inputting the ultrasound data to a motion correction algorithm, generating output as motion corrected ultrasound data, and generating the hemodynamic response data from the motion corrected ultrasound data.

3. The method as recited in claim 2, wherein the motion correction algorithm implements estimating sub-pixel displacements and correcting motion based on the sub-pixel estimations.

4. The method as recited in claim 3, wherein the motion correction algorithm also implements suppressing erroneous sub-pixel displacement estimates based on a tissue velocity curve.

5. The method as recited in claim 4, wherein the erroneous sub-pixel displacement estimates are suppressed by thresholding the tissue velocity curve to reject high speed values in the tissue velocity curve and performing an integral calculation on the tissue velocity curve after thresholding the velocity curve in order to estimate an updated displacement curve.

6. The method as recited in claim 1, wherein generating the hemodynamic response data includes inputting the ultrasound data to a tissue clutter filtering algorithm, generating output as tissue clutter filtered data, and generating the hemodynamic response data from the tissue clutter filtered data.

7. The method as recited in claim 1, wherein generating the hemodynamic response data comprises estimating the spinal cord blood volume change as a percentage of power Doppler signal variation compared to a baseline.

8. The method as recited in claim 1, wherein the stimulation parameters comprise a selection of a subset of available electrodes with which electrical stimulation will be provided.

* * * * *

UNITED STATES PATENT AND TRADEMARK OFFICE
CERTIFICATE OF CORRECTION

PATENT NO. : 12,446,970 B2  
APPLICATION NO. : 17/763391  
DATED : October 21, 2025  
INVENTOR(S) : Riazul Islam et al.

Page 1 of 1

It is certified that error appears in the above-identified patent and that said Letters Patent is hereby corrected as shown below:

In the Specification

Column 1, Line 58, "horn" should be --from--.

Eq. 5, Column 6, Line 53, "k = i" should be --k = 1--.

Column 9, Line 56, "MS" should be --fUS--.

Column 10, Line 31, "parameters frequency" should be --parameters (e.g., frequency--.

Column 12, Line 1, "100 can" should be --100 Hz can--.

Column 14, Line 31, "a connection" should be --a Wi-Fi connection--.

Signed and Sealed this  
Twenty-third Day of December, 2025

John A. Squires  
*Director of the United States Patent and Trademark Office*